March 10, 1936.　　　　L. GAZDA　　　　2,033,517
HEATING DEVICE
Filed June 18, 1934
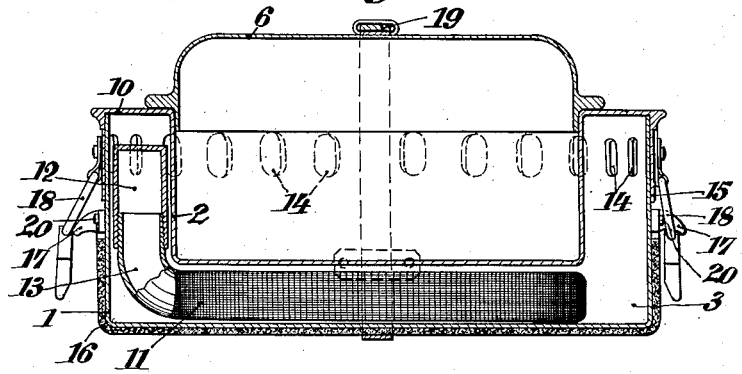
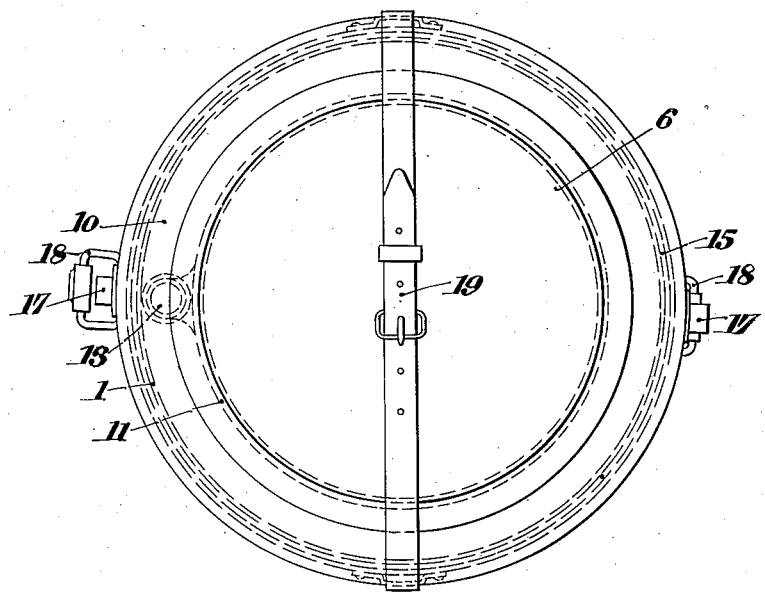
L. Gazda
INVENTOR
By: Marks & Clark
ATTYS.

Patented Mar. 10, 1936

2,033,517

UNITED STATES PATENT OFFICE 2,033,517

HEATING DEVICE

Leopoldine Gazda, Neuilly-sur-Seine, France

Application June 18, 1934, Serial No. 731,201
In France August 10, 1933

5 Claims. (Cl. 126—263)

This invention relates to an improved heating device in which means, used as the source of heating, produce a heating effect if moistened by water or another suitable liquid.

The heating device according to the present invention comprises an inner receptacle and an outer casing forming a heating space between said receptacle and said casing, means on said receptacle and said casing forming a lid over said space, a liquid pervious casing for fully enclosing a chemical heating charge and removably arranged in said heating space, and air ports in said double walled casing establishing communication between the heating space and the outside.

One mode of carrying out the present invention is illustrated by way of example on the accompanying sheet of drawing in which Figs. 1 and 2 show a cooker in sectional elevation and in plan view respectively.

The cooker consists of the receptacle 1 for the heating agent, and of the cooking vessel 2 which is inserted in said receptacle and is provided with a flange 10, which forms the lid for the receptacle 1 and overlaps the rim of the latter. In the receptacle 1 is inserted an insertion 11, which preferably is adapted to the floor of the cooking vessel 2, serves for the reception of the heating chemicals, and consists of a wire netting, perforated metal or the like and is furnished with filling tube 13, which is vertically arranged in the hollow space and adapted to be closed by a cap 12. Near the flange 10, the receptacle 1 is provided with a number of uniformly distributed slots 14 for the admission of air to the heating agent. An annular slide 15 is arranged on the receptacle 1 and provided with suitable ports. The said slide is mounted preferably on the flange 10 of the cooking vessel 2. When rotating the annular slide 15, the slots 14 of the receptacle 1 and the ports of said slide are placed in a position to coincide to a greater or smaller extent for controlling the admission of air to the hollow space 3. For the purpose of heat insulation, the receptacle 1 is covered with felt 16 or the like, which extends up to the rim of the annular slide 15 and is secured to the receptacle 1 by rivets 20. Tensioning devices serve for securing the cooking vessel 2 to the receptacle 1, said tensioning devices comprising hooks 17, fixed for instance to the wall 1 of the receptacle, and brackets 18 secured to the annular slide 15 and adapted to engage said hooks. The limbs of each tensioning bracket 18 are set apart a sufficient distance to permit the cooking vessel 2 to be fixed in any position of the slide 15. The cooking vessel 2 is shut by a lid 6, which may be secured by a belt 19, passing around said vessel 2 and said lid 6.

After the belt 19 is removed and the tensioning devices 17, 18 are opened it is possible to remove the cooking vessel 2 from the receptacle 1. The accessible netting insertion 11 is charged with heating chemicals by way of the charging tube 13 and the cooking vessel 2 is filled with foodstuff. Now a quantity of water corresponding to the volume of the cap 12 is added to the chemicals, the tube 13 is closed by the screw-cap 12 and the cooking vessel 2 is inserted in the receptacle 1. Hereafter the necessary volume of air is admitted to the hollow space 3 by turning the cooking vessel and adjusting the annular slide 15, and now the vessel 2 is clamped to the receptacle 1 by means of the tensioning devices 17, 18. The lid 6 is readily removable for watching the cooking. If the foodstuffs are cooked, the tensioning devices are disengaged and the cooking vessel containing the cooked foodstuffs can be removed from the receptacle 1.

What I claim is:—

1. Heating device, comprising in combination an inner receptacle and an outer casing forming a heating space between said receptacle and said casing, means on said receptacle and said casing forming a lid over said space, a liquid-pervious casing for fully enclosing a chemical heating charge and removably arranged in said heating space, and air ports in said double walled casing establishing communication between the heating space and the outside.

2. Heating device, comprising in combination an outer casing, an inner receptacle disposed within said casing and providing a heating space between said receptacle and said casing, a flange on said receptacle forming a lid over said space and overlapping the rim of the casing, a liquid-pervious casing for fully enclosing a chemical heating charge and removably arranged in said heating space, and air ports in said outer casing establishing communication between the heating space and the outside.

3. Heating device, comprising in combination an outer casing, an inner receptacle disposed within said casing and providing a heating space between said receptacle and said casing, a flange on said receptacle forming a lid over said space and overlapping the rim of the casing, a liquid-pervious member for the reception of a chemical heating charge arranged in said heating space, air ports in said casing establishing communication between the heating space and the outside, and a slide on the outer casing controlling the air ports.

4. Heating device, comprising in combination an outer casing, an inner receptacle disposed within said casing and leaving a heating space between said receptacle and said casing, a flange on said receptacle forming a lid over said space and overlapping the rim of the casing, a liquid-pervious member for the reception of a chemical heating charge arranged in said heating space, air ports in said casing establishing communication between the heating space and the outside, and an annular member secured to said flange and provided with air passages for controlling the air ports.

5. Heating device, comprising in combination an outer casing, an inner receptacle disposed within said casing and providing a heating space between said receptacle and said casing, a flange on said receptacle forming a lid over said space and overlapping the rim of the casing, a liquid-pervious member for the reception of a chemical heating charge arranged in said heating space, air ports in said case establishing communication between the heating space and the outside, an annular member secured to said flange and provided with air passages and overlapping said air ports for controlling same, and tensioning devices attached to said casing and said receptacle for securing the receptacle to the casing.

LEOPOLDINE GAZDA.